United States Patent
Specht et al.

(10) Patent No.: US 12,348,126 B2
(45) Date of Patent: Jul. 1, 2025

(54) METHOD AND SYSTEM FOR EMERGENCY OPERATION FOR A MODULAR MULTILEVEL CONVERTER

(71) Applicant: Dr. Ing. h.c. F. Porsche Aktiengesellschaft, Stuttgart (DE)

(72) Inventors: Eduard Specht, Bruchsal (DE); Daniel Simon, Ludwigsburg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 145 days.

(21) Appl. No.: 18/224,809

(22) Filed: Jul. 21, 2023

(65) Prior Publication Data

US 2024/0055978 A1    Feb. 15, 2024

(30) Foreign Application Priority Data

Aug. 9, 2022 (DE) ..................... 10 2022 120 005.1

(51) Int. Cl.
*B60L 3/00* (2019.01)
*H02J 7/00* (2006.01)
(Continued)

(52) U.S. Cl.
CPC ............. *H02M 1/325* (2021.05); *B60L 3/003* (2013.01); *B60L 3/0046* (2013.01);
(Continued)

(58) Field of Classification Search
CPC ...... H02M 1/325; H02M 1/32; H02M 7/4835; H02M 7/483; H02M 7/493; B60L 3/003;
(Continued)

(56) References Cited

U.S. PATENT DOCUMENTS

| 9,362,771 B2 | 6/2016 | Weissenborn et al. |
| 2010/0127661 A1 | 5/2010 | Stocking |

(Continued)

FOREIGN PATENT DOCUMENTS

| DE | 102011089309 A1 | 6/2013 |
| DE | 102014004234 A1 | 9/2014 |
| DE | 102020129135 B3 | 1/2022 |

OTHER PUBLICATIONS

Goetz et al., "Modular Multilevel Converter With Series and Parallel Module Connectivity: Topology and Control," Power Electronics, IEEE Transactions on Power Electronics, vol. 30, No. 1, 2015, pp. 203-215.

*Primary Examiner* — Elim Ortiz
(74) *Attorney, Agent, or Firm* — Buchanan Ingersoll & Rooney PC

(57) ABSTRACT

Method and system for emergency operation for a modular multilevel converter including a central controller and a plurality of battery modules. The respective battery module is given a respective switching state by the central controller at each switching stroke, through which a respective energy accumulator is connected to a respective energy accumulator of a respectively adjacent battery module. Through a module monitoring, a respectively faulty energy accumulator is reported to the central controller. For the respective battery module with a faulty energy accumulator, a bypass switching state is determined at each further switching stroke. If a threshold value defined by a specified number of faulty energy accumulators tolerable for an operation of the modular multilevel converter is exceeded, an emergency operation is caused, which includes an operating state change from "operation mode" to a "repair mode"; display of the same; and restriction of a further operating time until repair.

11 Claims, 2 Drawing Sheets

(51) Int. Cl.
  *H02M 1/32*       (2007.01)
  *H02M 7/00*       (2006.01)
(52) U.S. Cl.
  CPC .......... *H02J 7/0013* (2013.01); *H02J 7/0029* (2013.01); *B60L 2250/16* (2013.01)
(58) Field of Classification Search
  CPC .. B60L 3/0046; B60L 2250/16; B60L 3/0061; B60L 58/10; B60L 58/18; B60L 3/00; H02J 7/0013; H02J 7/0029; H02J 7/0024
  USPC .... 307/82, 66; 320/134, 118, 101, 104, 109; 318/139; 180/65.1; 701/22
  See application file for complete search history.

(56) References Cited

U.S. PATENT DOCUMENTS

| | | | |
|---|---|---|---|
| 2012/0274140 A1* | 11/2012 | Ganor | H02J 7/00 307/71 |
| 2018/0043789 A1* | 2/2018 | Goetz | H02M 3/33573 |
| 2021/0276556 A1 | 9/2021 | Hansen et al. | |
| 2023/0223604 A1* | 7/2023 | Maarbjerg | H02M 7/4835 324/426 |
| 2023/0387700 A1* | 11/2023 | Singer | H01M 10/441 |

* cited by examiner

METHOD AND SYSTEM FOR EMERGENCY OPERATION FOR A MODULAR MULTILEVEL CONVERTER

CROSS-REFERENCE TO RELATED APPLICATION

This application claims priority to German Patent Application No. 10 2022 120 005.1, filed Aug. 9, 2022, the content of such application being incorporated by reference herein in its entirety.

FIELD OF THE INVENTION

The present invention relates to a method and system for emergency operation for a modular multilevel converter, which drives, for example, an electric traction machine of a vehicle.

BACKGROUND OF THE INVENTION

In the case of a classical electric drive train of an electric vehicle having the components high-voltage (HV) DC battery/inverter/traction engine, a problem of the HV battery inevitably results in the electric vehicle breaking down because, according to safety requirements, all motor contactors are to be opened and the traction supply is thus interrupted. It would therefore be desirable for an electric vehicle with problems in the traction battery to have some type of emergency operation or emergency running property, referred to in English as "limp home," with which at least a service station can still be reached independently.

US 2012/0274140 A1, which is incorporated by reference herein, discloses a system of battery pack modules in which the decoupling of individual defective battery cells via MOSFET is supported, without a sustained interruption of the remaining power supply. The measure is controlled by a central processor, which detects the respective defective battery cell and adjusts the switching scheme, as needed. However, the circuit structure shown has hardly any connection options for individual battery cells among one another, such that, for example, during operation, a charge balance between individual battery cells is not possible.

A similar approach is described in DE 10 2014 004 234 A1, which is incorporated by reference herein. However, it cannot be derived from this how the failure of the battery cell in question is to be detected and how the switching states necessary for bypassing the cell are to be calculated.

DE 10 2011 089 309 A1, which is incorporated by reference herein, also proposes an AC traction battery with coupling elements in full-bridge circuits, which optionally release or bridge individual branches. However, details regarding failure detection are not disclosed to this extent.

US 2010/0127661 A1, which is incorporated by reference herein, discusses a traction battery with local fault detection. In this case, a faulty module is forcibly discharged by the controller by means of a battery-integrated load.

SUMMARY OF THE INVENTION

In light of the foregoing, a problem addressed by the present invention is to provide a method for maintaining an operation of a traction battery that ensures a further supply of power despite being restricted due to a faulty energy accumulator. This is intended to provide at least one emergency running property, with which a continued operation until the next possible repair is ensured. Further, a system on which the method is carried out is to be provided.

To solve the aforementioned problem, a method for emergency operation for a modular multilevel converter is proposed, wherein the modular multilevel converter comprises a central controller and a plurality of battery modules. A respective battery module comprises an energy accumulator and a plurality of semiconductor switches. The respective battery module is given a respective switching state by the central controller at each switching stroke, through which the respective energy accumulator is connected to a respective energy accumulator of a respectively adjacent battery module. The respective switching state is selected from a group consisting at least of a serial circuit, parallel circuit, a circuit in the bypass. By means of suitable switching states for the plurality of battery modules, which are arranged in at least one strand, at least one phase of an AC current is formed by the central controller, wherein, by module monitoring, a respective faulty energy accumulator is reported to the central controller. For the respective battery module with a faulty energy accumulator, a bypass switching state is determined at each further switching stroke. When calculating the switching states of all battery modules, the battery modules with fixed bypass switching states are considered. If a threshold value defined by a specified number of faulty energy accumulators tolerable for an operation of the modular multilevel converter is exceeded, an emergency operation is caused. The emergency operation comprises at least the following steps:

operating state changes from "operation mode" to a "repair mode";

display of the change to "repair mode" in the operator display;

restriction of a further operating time until a start of repair.

The modular multilevel converter is formed, for example, by a modular multilevel converter with serial and parallel connectivity, abbreviated as MMSPC or M2SPC, and is described, for example, in "Goetz, S. M.; Peterchev, A. V.; Weyh, T., "Modular Multilevel Converter With Series and Parallel Module Connectivity: Topology and Control," Power Electronics, IEEE Transactions, vol. 30, no. 1, pp. 203, 215, 2015. Doi: 10.1109/TPEL.2014.2310225, which article is incorporated by reference herein in its entirety (and not just the indicated pages). Such a modular multilevel converter system generates voltage differences between two terminals, for example a power grid or traction system of an electric car, through a configuration, caused by the central controller, of an electrical circuit of energy accumulators of the battery modules and through a switching modulation between switching states calculated by a scheduler in order to form any desired intermediate states. According to the present invention, the scheduler, which calculates logical switching states of all battery modules, after a report of a failure of a battery module by a faulty energy accumulator, no longer considers the latter for serial or parallel circuitry in further calculations and causes a current path which bypasses the faulty energy accumulator through the then still possible switching states calculated by it in the faulty battery module and optionally additionally in adjacent battery modules.

The respective energy accumulators are monitored by a battery management system, which also records, for example, discharge cycles and operating time. The respective battery module can also have its own respective battery management system, which reports the fault to the central controller in the event of a failure of the respective energy accumulator. It is conceivable to calculate a probability of failure from recorded data on a respective energy accumulator and to initiate emergency operation even at a high probability of failure, in particular at the same time with a very high probability of failure of several energy accumulator cells. It is also contemplated to consider further fault sources in a respective battery module, by which a current contribution of the respective battery module is not possible upon triggering of the emergency operation. Such fault sources are, for example, a failure of a respective power electronics or a cooling problem in the respective battery module.

By means of the method according to aspects of the invention, it is advantageously possible to continue operating the modular multilevel converter even with a failed energy accumulator. Although, due to the failure of at least one energy accumulator, a performance capacity or, in the case of a use of the modular multilevel converter as a traction battery in an electric vehicle, a range is reduced, at least in the latter example, it is now possible for a driver to avoid a breakdown and automatically approach a suitable service station.

In one embodiment of the method according to aspects of the invention, the bypass switching state is realized with a bypass plus or bypass+ or with a bypass minus or bypass-. Both switching states are also explained in FIG. 2 on the basis of a battery module with an energy accumulator and four semi-bridges connected in parallel.

In a further embodiment of the method according to aspects of the invention, the specified number is equal to one. This will already initiate the emergency operation in case of a first failed energy accumulator.

In yet another embodiment of the method according to aspects of the invention, in the repair mode, a first measure is formed by approaching a workshop designed for the repair of energy accumulators when using the modular multilevel converter as a traction battery of an electric vehicle. For this purpose, the nearest service station configured for a repair of energy accumulators is specified as a destination by the central controller for a navigation system of the electric vehicle. Alternatively, when using the modular multilevel converter in a stationary operation in the repair mode, a first measure is formed by the initiation of a repair service. For this purpose, a next available repair date is booked online by the central controller.

In a further embodiment of the method according to aspects of the invention, in emergency operation, a further step is formed by limiting a power output of battery modules. This avoids further failures of remaining energy accumulators due to overloading, or at least reduces a likelihood of a failure.

Further, a system for emergency operation of a modular multilevel converter is claimed, wherein the system comprises the modular multilevel converter having a central controller, a scheduler, a battery management system, and a plurality of battery modules. A respective battery module comprises an energy accumulator and a plurality of semiconductor switches.

The central controller is configured so as to give the respective battery module a respective switching state at each switching stroke, which connects the energy accumulator of the respective battery module to a respective energy accumulator of a respectively adjacent battery module, wherein the respective switching state is selected from a group consisting at least of a serial circuit, a parallel circuit, or a bypass circuit. The battery management system is configured so as to, by module monitoring, report a respectively faulty energy accumulator to the central controller and to determine a bypass switching state for the respective battery module with faulty energy accumulator for all further switching strokes. The scheduler is configured so as to consider battery modules with fixed bypass switching states when calculating the switching states for all battery modules. The central controller is configured so as to cause an emergency operation when a threshold value defined by a specified number of faulty energy accumulators tolerable for an operation of the modular multilevel converter is exceeded. The emergency operation comprises at least the following steps:

operating state changes from "operation mode" to a "repair mode";

display of the change to "repair mode" in the operator display;

restriction of a further operating time until a start of repair.

In one embodiment of the system according to aspects of the invention, the bypass switching state is realized with a bypass plus or bypass+ or with a bypass minus or bypass-.

In a further embodiment of the system according to aspects of the invention, the specified number is equal to one.

In yet another embodiment of the system according to aspects of the invention, in the repair mode, in a use of the modular multilevel converter as a traction battery of an electric vehicle, a first measure is formed by approaching a service station designed for the repair of energy accumulators. Alternatively, in the repair mode, in a use of the modular multilevel converter in a stationary operation, a first measure is formed by the initiation of a repair service.

In a further embodiment of the system according to aspects of the invention, in emergency operation, a further step is formed by limiting a power output of battery modules. This avoids further failures of remaining energy accumulators due to overloading, or at least reduces a likelihood of this occurring.

Additional advantages and configurations of the invention result from the description and the enclosed drawing.

It goes without saying that the aforementioned features and the features yet to be explained in the following can be used not only in the respectively specified combination, but also in other combinations or on their own, without leaving the scope of the present invention.

DETAILED DESCRIPTION OF THE INVENTION

Figure 1:
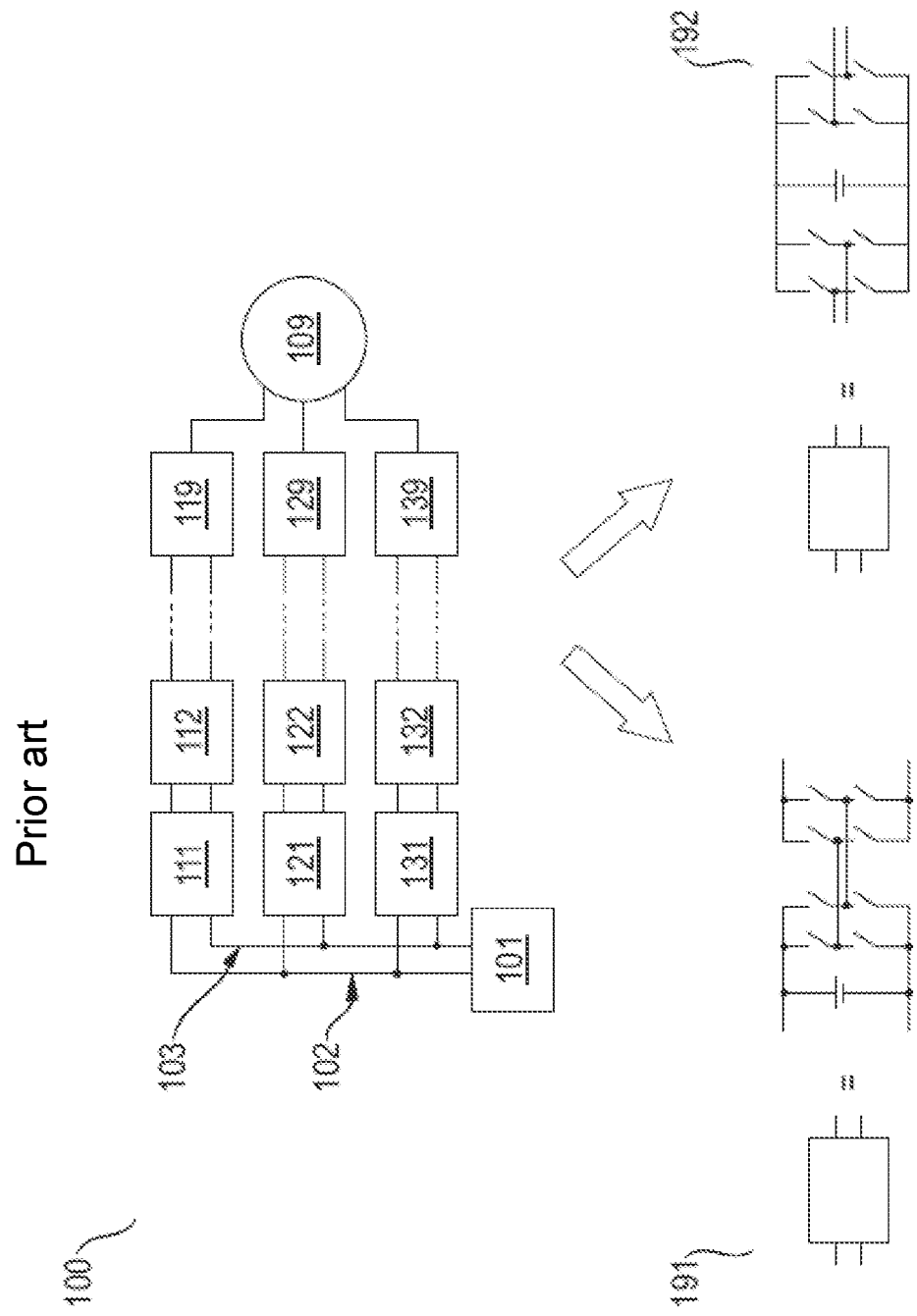
FIG. 1 schematically shows a modular multilevel converter from the prior art.

In FIG. 1, a modular multilevel converter 100 from the prior art is shown schematically. A first strand with battery modules 111, 112 to 119, a second strand with battery modules 121, 122 to 129, and a third strand with battery modules 131, 132 to 139 give, for example, an electric machine 109 a respective phase of an AC power. However, it is also conceivable that the consumer represented by reference numeral 109 is a power grid, through which on the one hand energy accumulators in the battery modules 111, 112, 119, 121, 122, 129, 131, 132, 139 can be charged, and on the other hand into which electrical power can also be fed by the modular multilevel converter. At a double star point 102, 103, there is a secondary supply tap, for example for a secondary voltage network, for example 12 V or 48 V in a vehicle. A voltage layer can also vary, which in turn depends on voltage layers of the respective modules 111, 112, 119, 121, 122, 129, 131, 132, 139. A respective battery module 111, 112, 119, 121, 122, 129, 131, 132, 139 comprises at least one energy accumulator and a plurality of semiconductor switches, e.g. MOSFETs, which can be arranged in semi-bridges. The shown battery modules 111, 112, 119, 121, 122, 129, 131, 132, 139 each have two input terminals and two output terminals, wherein the respective semiconductor switches, controlled by a central controller, can switch the respective energy accumulator either serially or in parallel with a respective energy accumulator of an adjacent battery module 111, 112, 119, 121, 122, 129, 131, 132, 139 while circumventing or bypassing. For this purpose, the two module topologies 191, 192 show possible configurations for a circuit design of a respective battery module 111, 112, 119, 121, 122, 129, 131, 132, 139, which, shown here as an example, comprises an energy accumulator and four semi-bridges. The first module topology 191 is a so-called asymmetrical topology, wherein the energy accumulator is arranged on the input side and a logical state, such as a bypass switching state, is formed via the four semi-bridges of the battery module 191. In the second module topology 192, the energy accumulator is arranged centrally so that it is a so-called symmetrical topology. This can be formed, for example in terms of control technology, via two semi-bridges of two adjacent asymmetrical modules 191. With both module topologies 191, 192, it is possible to implement a respective bypass switching state through which a defective energy accumulator can be bypassed.

Figure 2:
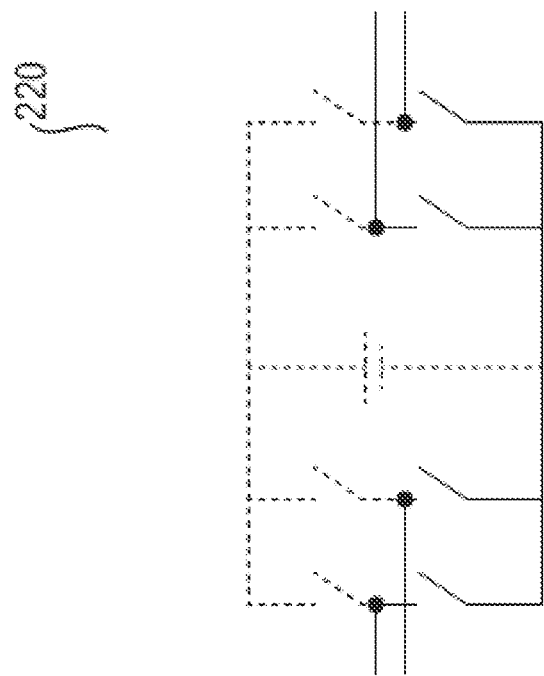
FIG. 2 shows two bypass switching states in one embodiment of the method according to aspects of the invention.
Figure 2:
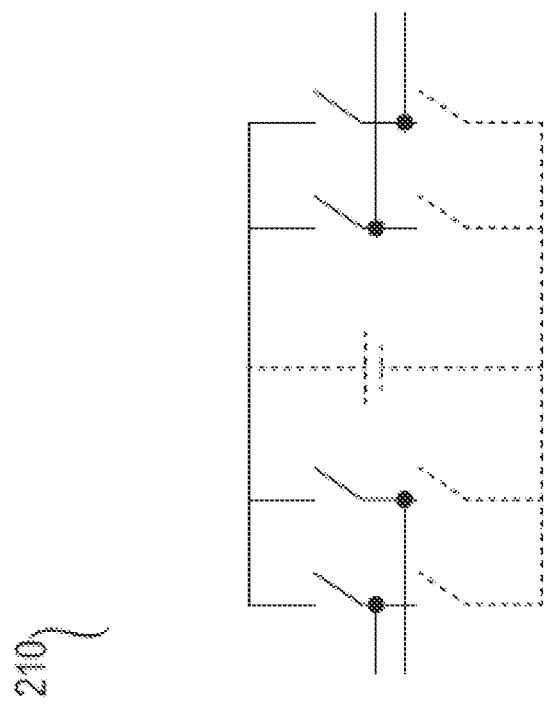

In FIG. 2, two bypass switching states 210, 220 are shown in one embodiment of the method according to aspects of the invention. Both bypass switching states 210, 220 are illustrated by way of example using the symmetrical second module topology (reference numeral 192 in FIG. 1), in which two adjacent modules with asymmetrical topology must control an implementation of the respective bypass switching states 210, 220 via the respective MOSFETs. In the asymmetrical topology of a module (not shown here), this would not be the case, rather the respective (asymmetrical) module controls the complete logical state alone, such as a bypass, for example. The bypass switching state 210 is called "bypass plus" or "bypass+" because a current path circumvents the energy accumulator on its positive pole terminal. Likewise, the bypass switching state 220 is changed to "bypass minus" or "bypass-" because the current path circumvents the energy accumulator on its negative pole terminal.

LIST OF REFERENCE NUMERALS

100 Arrangement diagram of modular multilevel converter
101 Secondary supply tap
102 First star point
103 Second star point
109 Electric machine
111 First battery module, first strand
112 Second battery module, first strand
119 Last battery module, first strand
121 First battery module, second strand
122 Second battery module, second strand
129 Last battery module, second strand
131 First battery module, third strand
132 Second battery module, third strand
139 Last battery module, third strand 191 First module topology
192 Second module topology
210 Switching state bypass+
220 Switching state bypass-

What is claimed is:

1. A method for emergency operation for a modular multilevel converter, wherein the modular multilevel converter comprises:
   a central controller and a plurality of battery modules,
   wherein a respective battery module of the plurality of battery modules comprises an energy accumulator and a plurality of semiconductor switches,
   wherein the respective battery module is assigned a respective switching state by the central controller at each switching stroke, through which switching state a respective energy accumulator is connected to a respective energy accumulator of a respectively adjacent battery module,
   wherein the respective switching state is selected from a group comprising a serial circuit, a parallel circuit, or a bypass circuit,
   wherein, through a module monitoring, a respectively faulty energy accumulator is reported to the central controller,
   wherein, for the respective battery module with a faulty energy accumulator, a bypass switching state is determined at each further switching stroke,
   wherein, in a calculation of switching states of all battery modules, the battery modules with determined bypass switching states are considered, and wherein, when a threshold value defined by a specified number of faulty energy accumulators tolerable for an operation of the modular multilevel converter is exceeded, an emergency operation is caused,
   wherein said emergency operation comprises at least the following steps:
      (i) operating state change from operation mode to a repair mode;
      (ii) displaying the change to repair mode in an operator display; and
      (iii) restricting a further operating time until a start of a repair.

2. The method according to claim 1, wherein the bypass switching state is realized by a bypass plus or a bypass minus.

3. The method according to claim 1, wherein, at the threshold value, the specified number is set equal to one.

4. The method according to claim 1, wherein, in the repair mode, either:
   (i) a first measure is formed, in a use of the modular multilevel converter as a traction battery of an electric vehicle, by approaching a service station designed for the repair of energy accumulators, or
   (ii) the first measure is formed, in a use of the modular multilevel converter in a stationary operation, by initiation of a repair service.

5. The method according to claim 1, wherein, in emergency operation, the method further comprises a step of limiting a power output of the battery modules, thereby avoiding further failures of remaining energy accumulators due to overloading.

6. A system for emergency operation of a modular multilevel converter, wherein the system comprises:
   the modular multilevel converter having a central controller, a scheduler, a battery management system, and a plurality of battery modules, wherein a respective battery module of the plurality of battery modules comprises an energy accumulator and a plurality of semiconductor switches, wherein the central controller is configured to assign the respective battery module a respective switching state at each switching stroke, which connects the energy accumulator of the respective battery module to a respective energy accumulator of a respectively adjacent battery module, wherein the respective switching state is selected from a group comprising a serial circuit, a parallel circuit, or a bypass circuit, wherein the battery management system is configured to report through a module monitoring a respectively faulty energy accumulator to the central controller and, for the respective battery module with a faulty energy accumulator, to determine a bypass switching state for all further switching strokes, wherein the scheduler is configured to factor in a calculation of switching states for all battery modules the battery modules with determined bypass switching states, and wherein the central controller is configured to cause an emergency operation when a threshold value defined by a specified number of faulty energy accumulators tolerable for an operation of the modular multilevel converter is exceeded, which emergency operation comprises at least the following steps:
(i) operating state change from operation mode repair mode;
(ii) display of the change to repair mode in an operator display; and
(iii) restriction of a further operating time until a start of repair.

7. The system according to claim 6, wherein the bypass switching state is realized by a bypass plus or a bypass minus.

8. The system according to claim 6, wherein, at the threshold value, the specified number is set equal to one.

9. The system according to claim 6, wherein, in the repair mode, either:
(i) a first measure is formed, in a use of the modular multilevel converter as a traction battery of an electric vehicle, by approaching a service station designed for the repair of energy accumulators, or
(ii) the first measure is formed, in a use of the modular multilevel converter in a stationary operation, by the initiation of a repair service.

10. The system according to claim 6, wherein, in the emergency operation, the emergency operation further comprises limiting a power output of battery modules, thereby avoiding further failures of remaining energy accumulators due to overloading.

11. A vehicle comprising a system for emergency operation of a modular multilevel converter, wherein the system comprises:

the modular multilevel converter having a central controller, a scheduler, a battery management system, and a plurality of battery modules, wherein a respective battery module of the plurality of battery modules comprises an energy accumulator and a plurality of semiconductor switches, wherein the central controller is configured to assign the respective battery module a respective switching state at each switching stroke, which connects the energy accumulator of the respective battery module to a respective energy accumulator of a respectively adjacent battery module, wherein the respective switching state is selected from a group comprising a serial circuit, a parallel circuit, or a bypass circuit, wherein the battery management system is configured to report through a module monitoring a respectively faulty energy accumulator to the central controller and, for the respective battery module with a faulty energy accumulator, to determine a bypass switching state for all further switching strokes, wherein the scheduler is configured to factor in a calculation of switching states for all battery modules the battery modules with determined bypass switching states, and wherein the central controller is configured to cause an emergency operation when a threshold value defined by a specified number of faulty energy accumulators tolerable for an operation of the modular multilevel converter is exceeded, which emergency operation comprises at least the following steps:
(i) operating state change from operation mode to a repair mode;
(ii) display of the change to repair mode in an operator display; and
(iii) restriction of a further operating time until a start of repair.

* * * * *